United States Patent
Huang et al.

(10) Patent No.: US 10,043,251 B2
(45) Date of Patent: Aug. 7, 2018

(54) ENHANCED TONE MAPPER FOR HIGH DYNAMIC RANGE IMAGES AND VIDEO

(71) Applicant: STMicroelectronics Asia Pacific Pte Ltd, Singapore (SG)

(72) Inventors: Yong Huang, Singapore (SG); Lucas Hui, Singapore (SG)

(73) Assignee: STMicroelectronics Asia Pacific PTE LTD, Singapore (SG)

( * ) Notice: Subject to any disclaimer, the term of this patent is extended or adjusted under 35 U.S.C. 154(b) by 260 days.

(21) Appl. No.: 14/969,255

(22) Filed: Dec. 15, 2015

(65) Prior Publication Data

US 2017/0103729 A1    Apr. 13, 2017

Related U.S. Application Data

(60) Provisional application No. 62/239,705, filed on Oct. 9, 2015.

(51) Int. Cl.

| | |
|---|---|
| *G06T 5/00* | (2006.01) |
| *G06T 5/20* | (2006.01) |
| *G09G 5/02* | (2006.01) |
| *G09G 5/10* | (2006.01) |
| *H04N 5/20* | (2006.01) |
| *H04N 5/202* | (2006.01) |
| *H04N 5/57* | (2006.01) |
| *H04N 5/76* | (2006.01) |
| *H04N 9/68* | (2006.01) |
| *H04N 9/77* | (2006.01) |

(Continued)

(52) U.S. Cl.
CPC ............... *G06T 5/20* (2013.01); *G06T 5/008* (2013.01); *G09G 5/02* (2013.01); *G09G 5/10* (2013.01); *H04N 5/20* (2013.01); *H04N 5/202* (2013.01); *H04N 5/57* (2013.01); *H04N 5/76* (2013.01); *H04N 9/68* (2013.01); *H04N 9/77* (2013.01); *H04N 11/004* (2013.01); *G06T 2207/10024* (2013.01); *G09G 2320/0271* (2013.01); *G09G 2320/0673* (2013.01); *G09G 2340/06* (2013.01); *G09G 2360/16* (2013.01); *H04N 5/144* (2013.01)

(58) Field of Classification Search
None
See application file for complete search history.

(56) References Cited

U.S. PATENT DOCUMENTS

| | | |
|---|---|---|
| 7,145,607 B1 | 12/2006 | Hui |
| 7,953,286 B2 | 5/2011 | Chiang et al. |
| 8,781,248 B2 | 7/2014 | Wang et al. |

(Continued)

OTHER PUBLICATIONS

Miller, "A Perceptual EOTF for Extended Dynamic Range Imagery," SMPTE Monthly Webcast: Title, Professional Development Academy, Dolby Laboratories, Inc., 2014, 17 pages.

*Primary Examiner* — Ryan M Gray
(74) *Attorney, Agent, or Firm* — Seed IP Law Group LLP

(57) ABSTRACT

Various embodiments provide tone mapping of images and video from one dynamic range to an available dynamic range of a display device while preserving or enhancing image details. According to one embodiment, an enhanced tone mapping module is configured to decrease a luminance of an image or video from a high dynamic range to a standard dynamic range. Conversely, according to one embodiment, an enhanced inverse tone mapper to increase a luminance of an image or video from a standard dynamic range to a high dynamic range.

14 Claims, 7 Drawing Sheets

(51) Int. Cl.
*H04N 11/24* (2006.01)
*H04N 5/14* (2006.01)

(56) References Cited

U.S. PATENT DOCUMENTS

| | | | |
|---|---|---|---|
| 9,076,224 B1* | 7/2015 | Shah | G06T 5/009 |
| 9,092,856 B2 | 7/2015 | Deng et al. | |
| 9,412,155 B2* | 8/2016 | Steiner | G06T 5/007 |
| 2008/0150853 A1* | 6/2008 | Peng | G09G 3/3426 |
| | | | 345/87 |
| 2008/0297460 A1* | 12/2008 | Peng | G09G 3/3426 |
| | | | 345/102 |
| 2015/0221280 A1* | 8/2015 | Van Der Vleuten | H04N 1/6027 |
| | | | 382/167 |
| 2015/0237322 A1* | 8/2015 | Stec | H04N 9/77 |
| | | | 348/453 |
| 2016/0012570 A1* | 1/2016 | Zhang | G06T 3/4015 |
| | | | 382/167 |
| 2016/0127665 A1* | 5/2016 | Cho | G06T 5/008 |
| | | | 348/241 |
| 2016/0301959 A1* | 10/2016 | Oh | H04N 21/23432 |
| 2017/0287116 A1* | 10/2017 | Senzaki | G06T 5/002 |

* cited by examiner

ENHANCED TONE MAPPER FOR HIGH DYNAMIC RANGE IMAGES AND VIDEO

TECHNICAL FIELD

The present disclosure is directed to tone mapping of images and video from one dynamic range to another and luminance contrast enhancement to preserve or enhance image and video details during mapping.

DESCRIPTION OF THE RELATED ART

Luminance represents the pixel brightness of an image or video. The dynamic range, or contrast ratio, of an image or video is the luminance difference between the darkest and lightest portions of the image or video. In general, standard dynamic range (SDR) is less than or equal to 10 f-stops (1024:1), enhanced dynamic range (EDR) is greater than 10 f-stops and less than or equal to 16 f-stops (65536:1), and high dynamic range (HDR) is greater than 16 f-stops (65536:1). An ultra high dynamic range (UHDR) is also available and greater ranges will continue to be made available by the advancing technology.

With the demand for high quality images and video, many images and video are produced with a high dynamic range of luminosity. However, many display devices, such as cathode ray tubes and liquid crystal displays, are capable of displaying only standard or enhanced dynamic ranges, not high dynamic ranges.

Tone mapping to modify color tones is often used when the dynamic range of an image or video is larger or smaller than the capability of a display device. Generally, tone mapping matches one dynamic range to another dynamic range by decreasing/compressing or increasing/expanding the luminance ratios and color values to the proper dynamic range. However, compressing an image or video from a high dynamic range to a lower dynamic range, such as an enhanced or standard dynamic range, often results in loss of image details. For instance, certain features of an image may become less visible.

BRIEF SUMMARY

The present disclosure provides a color tone mapping module configured to decrease a luminance range of an image or video from a high dynamic range to a standard dynamic range, and an inverse color tone mapping module configured to increase a luminance range of an image or video from a standard dynamic range to a high dynamic range, while preserving or enhancing image details.

According to one embodiment, a tone mapping module receives high dynamic range red, green, blue values. The tone mapping module includes an RGB to Y/I/V module, a low-pass filter module, a mapping curve generator module, a HDR-SDR mapping module, an adaptive boost control module, and a brightness analysis module. The RGB to Y/I/V module converts the high dynamic range red, green, blue values to luminance values. The low-pass filter module determines low spatial frequency components of the luminance values. The mapping curve generator module generates a mapping curve that is used by the HDR-SDR mapping module to map the high dynamic range red, green, blue values to standard dynamic range red, green, blue values. The brightness analysis temporally controls a maximum luminance value and an average luminance value for the mapping curve generator module and the adaptive boost control module to prevent flickering. The adaptive boost control module uses the low spatial frequency components and the luminance values to determine a gain value. The gain value is applied to the standard dynamic range red, green, blue values to obtain enhanced red, green, blue values within a standard dynamic range. The enhanced red, green, blue values are then outputted According to one embodiment, an inverse tone mapping module receives standard dynamic range red, green, blue values of an image or video. The inverse tone mapping module includes a RGB to Y/I/V module, a sub-band divider, an adaptive boost control module, a saturation control module, a SDR-HDR mapping module, and a de-banding filter. The RGB to Y/I/V module converts the standard dynamic range red, green, blue values to luminance values. The sub-band divider determines low and high spatial frequency components of the luminance values. The adaptive boost control module uses the low and high spatial frequency components to determine a gain value. The gain value is applied to the standard dynamic range red, green, blue values to obtain enhanced range red, green, blue values. The saturation control module prevents out of gamut values of the enhanced range red, green, blue values from being clipped and causing false colors in the image or video. The SDR-HDR mapping module maps the saturated controlled red, green, blue values to high dynamic range red, green, blue values. The de-banding filter module filters banding noise from the high dynamic range red, green, blue values. The high dynamic range red, green, blue values are then outputted from the de-banding filter module.

The tone mapping module and the inverse tone mapping module disclosed herein results in tone mapping of images and video from one dynamic range to another dynamic range while preserving or enhancing image details.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

DETAILED DESCRIPTION

Figure 1:
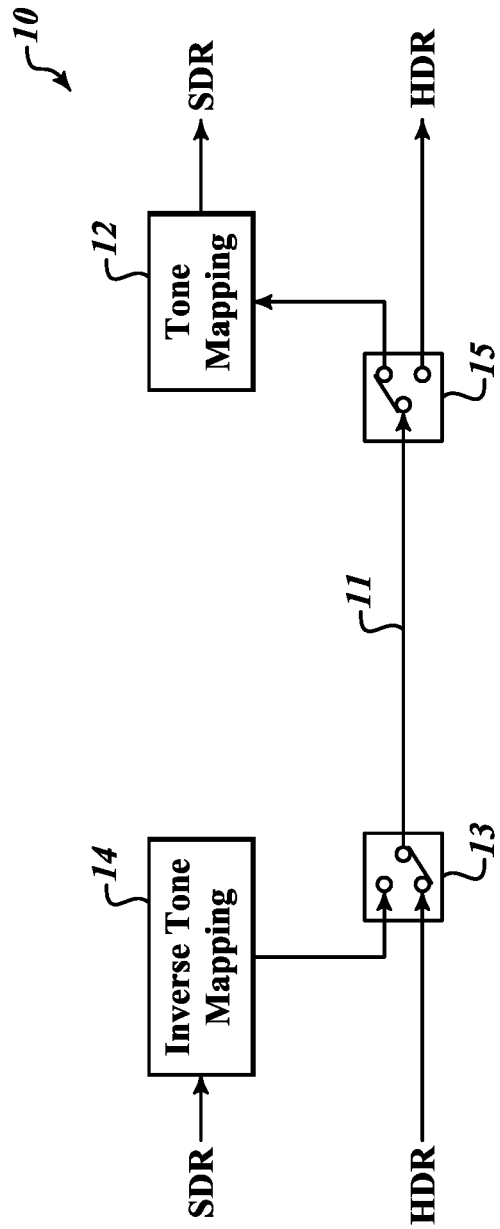
FIG. 1 is a block diagram that shows a signal path illustrating an example of a video processing pipeline according to one embodiment as disclosed herein.

In the following description, certain specific details are set forth in order to provide a thorough understanding of various embodiments of the disclosure. However, one skilled in the art will understand that the disclosure may be practiced without these specific details. In some instances, well-known details associated with image and video processing has not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1 is a block diagram that shows a signal path illustrating an example of a video processing pipeline 10 according to principles disclosed herein. The video processing pipeline 10 includes a tone mapping module 12, an inverse tone mapping module 14, and switches 13 and 15.

The data is created or input at the left side of FIG. 1. It can be created or input as either SDR data or HDR data. For example, older cameras, phones and low cost systems record data only in the SDR range. More recent recording systems, such as HDR cameras and high definition computers will create or generate original data as HDR data. The data can also be created as EDR, UHDR or some other range value.

After the data is created, it needs to be transmitted to a new location, often over the transmission line 11. Each transmission line has different bandwidths and capabilities. These are set when the transmission line is created and usually remain the same for the life of the line. Older transmission lines are all SDR or lower. New transmission lines are HDR or higher.

FIG. 1 illustrates the example in which the transmission line 11 is carried out in HDR. The transmission line 11 may be any acceptable transmission line, such as fiber optic, high speed cable, satellite transmission, wireless, or any other acceptable transmission line. All of the components in the transmission line, such as the repeaters and various switches and amplifiers, are usually customized to a particular format, whether SDR, HDR, UHDR, or the like. Accordingly, the data which is placed on the transmission line needs to match the capabilities of that particular transmission line. In the example of FIG. 1, since the transmission line 11 is an HDR transmission line, all data which is carried on the line needs to be in the HDR format. If an input signal is in the HDR format, then no changes need to be made, and the switch 13 is positioned to directly connect the HDR input to be provided on the transmission line 11, as shown in FIG. 1. On the other hand, if an input signal has a format other than HDR, such as SDR, UHDR, or the like, then some type of tone mapping needs to take place, whether an inverse tone mapping or a standard tone mapping, in order to convert the signal to the HDR format for transmission on the transmission line 11. Accordingly, if the signal available is SDR as shown in FIG. 1, then it passes through the inverse tone mapping block 14, and the switch 13 is placed in a different position than is shown in FIG. 1, namely the input comes from the inverse tone mapping block 14. The inverse tone mapping block 14 changes the formatted signal from the SDR format to the HDR format so that it may be properly and safely carried on the transmission line 11.

The output side of the transmission line 11 is selected according to the needs of the equipment that is receiving it at the other end. If the equipment receiving the signal is an older style TV set, or an older receiver that can only work in SDR, then it will be necessary to transform the HDR signal on transmission line 11 into an SDR format. Accordingly, the switch is positioned as shown in block 15 to input the HDR signal on transmission line 11 into the tone mapping block 12 so that the formatted signal can be transformed from the HDR format to the SDR format, and then output to the equipment at the output end so that it can be properly viewed and received. On the other hand, if the equipment at the other end is HDR equipment, then no tone mapping is needed. The signal on the transmission line 11 is already in the HDR format. Accordingly, if an HDR format is required, then the position of the switch in box 15 is changed to provide the direct output in the HDR format. In the event the input is an HDR signal and the output desired is an HDR signal, then no tone mapping is required. The switches will be placed in the appropriate positions to feed the input signal onto the transmission line 11 and then output directly as the HDR output signal.

The appropriate switches and block connections will be provided for each type of input signal and transmission line, following the example of FIG. 1. In numerous locations, transmission lines 11 that transmit in the SDR format are widely used and already in place. It is therefore desired to transmit the signal in the SDR format rather than provide an entirely new transmission line, which could be cost prohibitive. If the input signal is in the SDR format, then this is acceptable, and the SDR format signal can be provided directly to the box 13, carried on an SDR format transmission line 11, and then output directly as an SDR format out of box 15 without having to pass through any tone mapping of any type. On the other hand, in the event an SDR transmission line 11 is used, and either the input or the output is some format other than SDR, such as HDR or UHDR, then some type of tone mapping will need to take place. In the situation which the signal as originally generated is in the HDR format, as may be done with an HD camera or from a computer output, if it is being transmitted on a signal line which is only capable of carrying an SDR signal, then it will be necessary to convert the signal from the HDR down to the lower dynamic range of the SDR level so that it can be carried on the transmission lines which are already in place. In such a case, the HDR signal is fed into a tone mapping block at the input, and the output of the tone mapping is an SDR signal which can then be input to the block 13 and put on the SDR transmission line 11. Similarly, if the signal which is traveling on the transmission line 11 is an SDR signal, and it is desired to output it to an HDR system, then an inverse tone mapping circuit is provided at the output of the transmission line, so that the SDR signal can be converted through the inverse tone mapping circuit into an HDR format and then provided to the HD equipment on which it is viewed.

The various embodiments as shown herein will therefore have a convenient use in those situations in which a home may have two TV sets, one an HD TV and the other a standard TV. The signal which is entering the house may be an HD signal or, on the other hand, many channels come in both SDR format and also HDR format. The circuit can provide as an output both the SDR format and the HDR format, and make these available. The end user therefore can connect the standard TV to the SDR output and the high definition TV to the HDR output. The appropriate type of mapping, whether inverse tone mapping or standard tone mapping can be used, depending on the type of transmission line 11 on which the data was originally carried to the home.

The video processing pipeline 10 adjusts luminance levels of images and video from a source, such as a camera, computer, or multimedia content provider, to be within an available dynamic range of a display device, such as a cathode-ray tube display, light-emitting diode display, or a liquid crystal display. For example, the source may provide images or video having a high dynamic range to a display device having a standard dynamic range. In this case, the image or video is mapped to the standard dynamic range by the tone mapping module 12. As will be discussed in further detail with respect to FIGS. 2-6, the tone mapping module 12 decreases the luminance of the image or video that has a high dynamic range to be within the standard dynamic range, namely to be an SDR signal, while preserving and enhancing image and color details. Conversely, the source may provide images or video having a standard dynamic range to a display device having a high dynamic range. In this case, the image or video is mapped to the high dynamic range by the inverse tone mapping module 14. As will be discussed in further detail with respect to FIG. 7, the inverse tone mapping module 14 increases the luminance of the image or video from the standard dynamic range to be within the high dynamic range, namely to be an HDR signal, while preserving and enhancing image and color details.

Figure 2:
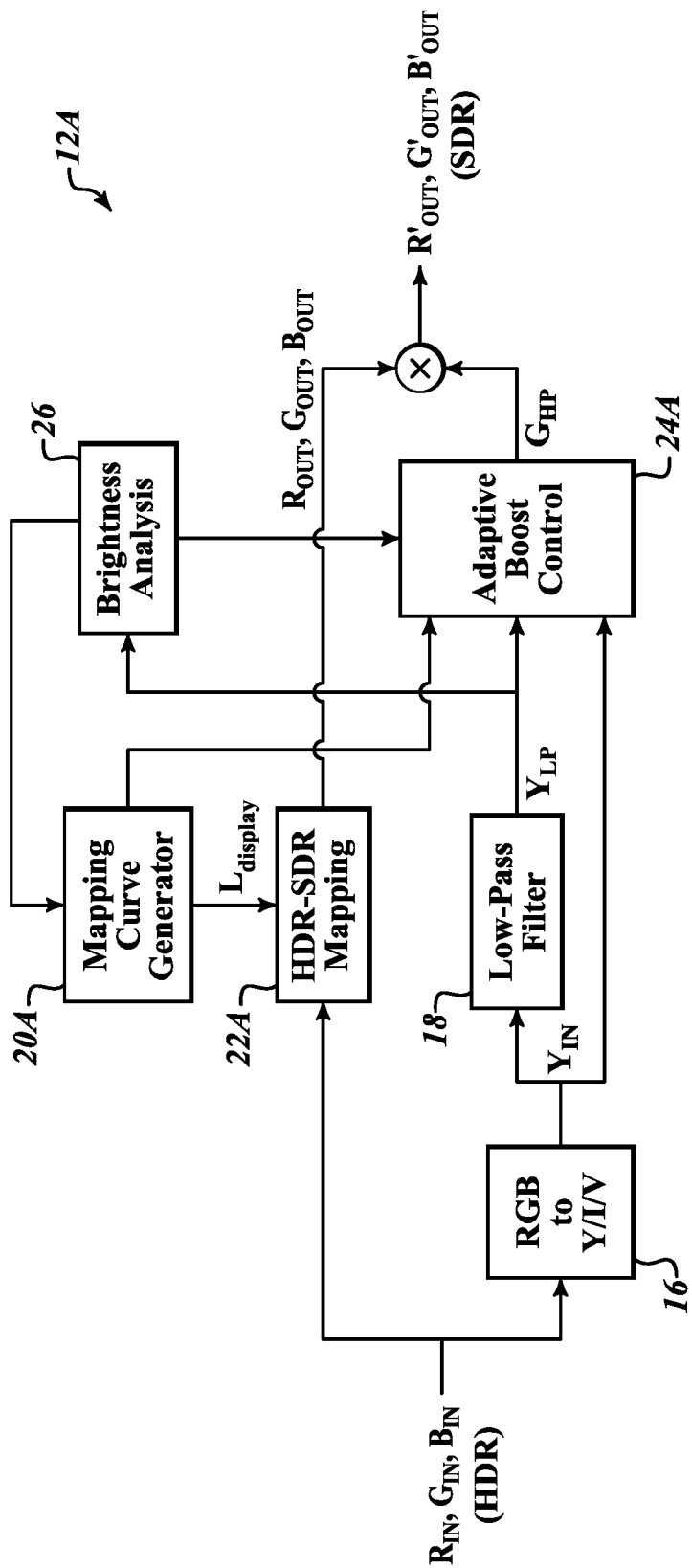
FIG. 2 is a block diagram illustrating an example of a tone mapping module according to a first embodiment as disclosed herein.

FIG. 2 is a block diagram illustrating an example of a first embodiment of a tone mapping module 12A according to principles disclosed herein. The tone mapping module 12A decreases the luminance of the image or video from the high dynamic range to the standard dynamic range, while preserving or enhancing image details. The tone mapping module 12A includes an RGB to Y/I/V module 16, a low-pass filter module 18, a mapping curve generator module 20A, a HDR-SDR mapping module 22A, and adaptive boost control module 24A, and a brightness analysis module 26.

The tone mapping module 12A receives high dynamic range red, green, blue values $R_{IN}$, $G_{IN}$, $B_{IN}$ of an image or video from the source. In one embodiment, the high dynamic range red, green, blue values $R_{IN}$ $G_{IN}$, $B_{IN}$ is included in an array, where each red, green, blue value corresponds to a pixel. In other embodiments, the high dynamic range red, green, blue values $R_{IN}$, $G_{IN}$, $B_{IN}$ are represented as bits. The invention, however, is not limited to any particular representation of the red, green, blue values $R_{IN}$, $G_{IN}$, $B_{IN}$ and other conventional techniques may be used.

The RGB to Y/I/V module 16 processes the high dynamic range red, green, blue values $R_{IN}$ $G_{IN}$, $B_{IN}$ to obtain luminance values $Y_{IN}$. The Y/I/V module 16 can process the data using either a Y, I or V format. The luminance can be obtained as an I or V type value, as is known in the art, and in the example provided, it is obtained as a Y. As previously discussed, a luminance value represents a pixel's brightness or intensity. In general, a large luminance value represents a bright pixel, and a small luminance value represents a dark pixel. In one embodiment, the luminance values $Y_{IN}$ are calculated using the following equation.

$$Y_{IN} = \max(R_{IN}, G_{IN}, B_{IN}, a \times R_{IN} + b \times G_{IN} + c \times B_{IN})$$

where a, b, and c, are constants for red, green, blue to luminance conversion. It should be noted that other conventional methods may be used.

The low-pass filter module 18 receives the luminance values $Y_{IN}$ from the RGB to Y/I/V module 16. The low-pass filter module 18 processes the luminance values $Y_{IN}$ to obtain low spatial frequency components $Y_{LP}$ of the luminance values $Y_{IN}$. Particularly, the low-pass filter module 18 passes the low spatial frequency components $Y_{LP}$ and attenuates high spatial frequency components $Y_{HP}$ of the luminance values $Y_{IN}$. Typically, luminance values with low spatial frequency pertain to larger regions of an image, and luminance values with high spatial frequency pertain to smaller, more detailed regions of an image. In one embodiment, the low spatial frequency components $Y_{LP}$ are calculated using the following equation.

$$Y_{LP} = LPF(Y_{IN})$$

where LPF( ) is a 7-Tap H $_+$3-Tap V filter. It should be noted that other conventional methods may be used.

The mapping curve generator module 20A generates a mapping curve $L_{display}$ that is used to map luminance values from a high dynamic range to a standard dynamic range. In one embodiment, the mapping curve $L_{display}$ is calculated using the following equation.

$$L_{display}(Y_X) = LUT_{gamma}(LUT_{SCurve}(LUT_{ToneMap}(Y_X)))$$

where $Y_x$ is an input, $LUT_{Gamma}$ is a lookup table for a gamma curve, $LUT_{SCurve}$ is a lookup table for an S curve, and $LUT_{ToneMap}$ is a lookup table for a tone mapping curve. As will be discussed with respect to the HDR-SDR mapping module 22A, $Y_x$ may be the red, green, blue values $R_{IN}$, $G_{IN}$, $B_{IN}$, the luminance values $Y_{IN}$, or the low spatial frequency components $Y_{LP}$.

$LUT_{Gamma}$, $LUT_{SCurve}$, and $LUT_{ToneMap}$ are not limited to any particular set of curves. For example, in one embodiment, $LUT_{ToneMap}$ may be an SMPT ST 2084 curve defined by the following equation.

$$V = \left( \frac{(Y/L)^n * c_2 + c_1}{(Y/L)^n * c_3 + 1} \right)^m$$

where $0 \le V \le 1$; L=10,000; m=78.8438; n=0.1593; $c_1$=0.8359; $c_2$=18.8516; and $c_3$=18.6875. In another embodiment, $LUT_{SCurve}$ is an adaptive S curve. For example, see U.S. Pat. No. 7,953,286, entitled "Automatic Contrast Enhancement," and U.S. Pat. No. 8,781,248, entitled "Image Details Preservation and Enhancement." In a further embodiment, as will be discussed in further detail with respect to the HDR-SDR mapping module 22A, $LUT_{Gamma}$, $LUT_{SCurve}$, and $LUT_{ToneMap}$ are customized based on the input of the HDR-SDR mapping module 22A. It should be noted that other conventional curves may be used.

In one embodiment, a perceptual quantizer is used. For example, the mapping curve $L_{display}$ may be calculated using the following equation.

$$L_{display}(Y_X) = LUT_{gamma}(LUT_{SCurve}(LUT_{ToneMap}(LUT_{PQ}{-1}(Y_X))))$$

where $LUT_{PQ}^{-1}$ is a lookup table for a perceptual quantizer. For example, see "A Perceptual EOTF for Extended Dynamic Range Imagery," Miller, Dolby Laboratories, Inc. In a further embodiment, as will be discussed in further detail with respect to the brightness analysis module 26, the $LUT_{ToneMap}$ is determined based on a brightness analysis. There are many types of mapping curves and mapping curve generators that are well known in the art, and therefore further examples need not be given since any of those which are known in the prior art would be acceptable for use as the mapping curve generator 20A as shown in FIG. 2.

The HDR-SDR mapping module 22A maps the high dynamic range red, green, blue values $R_{IN}$, $G_{IN}$, $B_{IN}$ using the mapping curve $L_{display}$ to obtain standard dynamic range red, green, blue values $R_{OUT}$, $G_{OUT}$, $B_{OUT}$. In one embodiment, the HDR-SDR mapping module 22A uses the high dynamic range red, green, blue values $R_{IN}$, $G_{IN}$, $B_{IN}$ as input. For example, the standard dynamic range red, green, blue values $R_{OUT}$, $G_{OUT}$, $B_{OUT}$ may be calculated using the following equations.

$$R_{OUT}=G_C(R_{IN}) \times R_{IN}$$

$$G_{OUT}=G_C(G_{IN}) \times G_{IN}$$

$$B_{OUT}=G_C(B_{IN}) \times B_{IN}$$

where $G_C(Y_X)=L_{display}(Y_X)/Y_X$. In another embodiment, the HDR-SDR mapping module 22A uses the luminance values $Y_{IN}$ as input. For example, the mapped the red, green, blue values $R_{OUT}$, $G_{OUT}$, $B_{OUT}$ may be calculated using the following equations.

$$R_{OUT}=G_C(Y_{IN}) \times R_{IN}$$

$$G_{OUT}=G_C(Y_{IN}) \times G_{IN}$$

$$B_{OUT}=G_C(Y_{IN}) \times B_{IN}$$

where $G_C(Y_X)=L_{display}(Y_X)/Y_X$. In a further embodiment, the HDR-SDR mapping module 22A uses the low spatial frequency components $Y_{LP}$ as input. For example, the standard dynamic range red, green, blue values $R_{OUT}$, $G_{OUT}$, $B_{OUT}$ may be calculated using the following equations.

$$R_{OUT}=G_C(Y_{LP}) \times R_{IN}$$

$$G_{OUT}=G_C(Y_{LP}) \times G_{IN}$$

$$B_{OUT}=G_C(Y_{LP}) \times B_{IN}$$

where $G_C(Y_X)=L_{display}(Y_X)/Y_X$. It should be noted that other conventional methods may be used to map the high dynamic range red, green, blue values $R_{IN}$, $G_{IN}$, $B_{IN}$.

In one embodiment, the $LUT_{Gamma}$, $LUT_{SCurve}$, and $LUT_{ToneMap}$ lookup tables may be customized based on the input of the HDR-SDR mapping module 22A. For example, a first set of curves may be used for $LUT_{Gamma}$, $LUT_{SCurve}$, and $LUT_{ToneMap}$ when the HDR-SDR mapping module 22A uses the red, green, blue values $R_{IN}$, $G_{IN}$, $B_{IN}$ as input; a second set of curves may be used for $LUT_{Gamma}$, $LUT_{SCurve}$, and $LUT_{ToneMap}$ when the HDR-SDR mapping module 22A uses the luminance values $Y_{IN}$ as input; and a third set of curves may be used for $LUT_{Gamma}$, $LUT_{SCurve}$, and $LUT_{ToneMap}$ when the HDR-SDR mapping module 22A uses the low spatial frequency components $Y_{LP}$ as input.

The adaptive boost control module 24A determines a gain $G_{HP}$ that is used to preserve or enhance image details. Particularly, the adaptive boost control module 24A calculates the amount of the gain $G_{HP}$ to be applied to the standard dynamic range red, green, blue values $R_{OUT}$, $G_{OUT}$, $B_{OUT}$.

In one embodiment, the gain $G_{HP}$ is calculated using the following equation.

If $Y_{LP} \neq 0$, $G_{HP}=1+k \times (Y_{HP}/Y_{LP})$ else, $G_{HP}=1$ where k is a control parameter and $Y_{HP}$ is the high frequency spatial components of the luminance values $Y_{IN}$. In one embodiment, the control parameter K is adaptive to a current luminance value, a mean luminance value, and/or contrast. For example, see U.S. Pat. No. 8,781,248, entitled "Image Details Preservation and Enhancement." The high spatial frequency components $Y_{HP}$ may be calculated using the following equation.

$$Y_{HP}=Y_{IN}-Y_{LP}$$

It should be noted that any other known method may be used to determine the high frequency spatial components of the luminance values $Y_{IN}$. For example, a high-pass filter or a bandpass filter may be used. As will be discussed in further detail with respect to the brightness analysis module 26, in one embodiment, the gain may be determined based on a brightness analysis.

The gain $G_{HP}$ is then applied to the standard dynamic range red, green, blue values $R_{OUT}$, $G_{OUT}$, $B_{OUT}$ to obtain enhanced red, green, blue values $R'_{OUT}$, $G'_{OUT}$, $B'_{OUT}$. The enhanced red, green, blue values $R'_{OUT}$, $G'_{OUT}$, $B'_{OUT}$ are within a standard dynamic range and have image details preserved or enhanced by the gain $G_{HP}$. In one embodiment, the gain $G_{HP}$ is applied to the standard dynamic range red, green, blue values $R_{OUT}$, $G_{OUT}$, $B_{OUT}$ by multiplying each pixel of the standard dynamic range red, green, blue values $R_{OUT}$, $G_{OUT}$, $B_{OUT}$ by the corresponding gain $G_{HP}$. For example, the enhanced red, green, blue values $R'_{OUT}$, $G'_{OUT}$, $B'_{OUT}$ may be calculated using the following equations.

$$R'_{OUT}=R_{OUT} \times G_{HP}$$

$$G'_{OUT}=G_{OUT} \times G_{HP}$$

$$B'_{OUT}=B_{OUT} \times G_{HP}$$

It should be noted that any other known method may be used to apply the gain $G_{HP}$ to the standard dynamic range red, green, blue values $R_{OUT}$, $G_{OUT}$, $B_{OUT}$.

The tone mapping module 12A then outputs the enhanced red, green, blue values $R'_{OUT}$, $G'_{OUT}$, $B'_{OUT}$ that are within the standard dynamic range.

In another embodiment, a minimum and maximum control is used to calculate a controlled gain $G'_{HP}$. The controlled gain $G'_{HP}$ may be calculated using the following equations.

If $max(R_{OUT}, G_{OUT}, B_{OUT}) \neq 0$, $G_{min}=1.0/max(R_{OUT}, G_{OUT}, B_{OUT})$ else, $G_{min}=1$ If $min(R_{OUT}, G_{OUT}, B_{OUT}) \neq 0$, $G_{max}=r/min(R_{OUT}, G_{OUT}, B_{OUT})$ else, $G_{max}=1$ If $G_{HP} \geq 1.0$, $G'_{HP}=min(G_{HP}, G_{max})$ else, $G'_{HP}=max(G'_{HP}, G_{min})$ where r is based on the bit resolution of the output of the tone mapping module 12A. For example, r=1023 when the output has a bit resolution of 10 bits.

The gain $G'_{HP}$ is then applied to the standard dynamic range red, green, blue values $R_{OUT}$, $G_{OUT}$, $B_{OUT}$ to obtain the enhanced red, green, blue values $R'_{OUT}$, $G'_{OUT}$, $B'_{OUT}$. For example, the enhanced red, green, blue values $R'_{OUT}$, $G'_{OUT}$, $B'_{OUT}$ may be calculated using the following equations.

$$R'_{OUT}=R_{OUT} \times G'_{HP}$$

$$G'_{OUT}=G_{OUT} \times G'_{HP}$$

$$B'_{OUT}=B_{OUT} \times G'_{HP}$$

It should be noted that any other known method may be used to apply the gain $G'_{HP}$ to the standard dynamic range red, green, blue values $R'_{OUT}$, $G'_{OUT}$, $B'_{OUT}$.

In one embodiment, the brightness analysis module 26 performs a brightness analysis for the mapping curve generator module 20A and the adaptive boost control module 24A. Dramatic changes between frames of a video may cause flickering. The brightness analysis module 26 temporally controls a maximum luminance value and an average luminance value to avoid such flickering.

Figure 3:
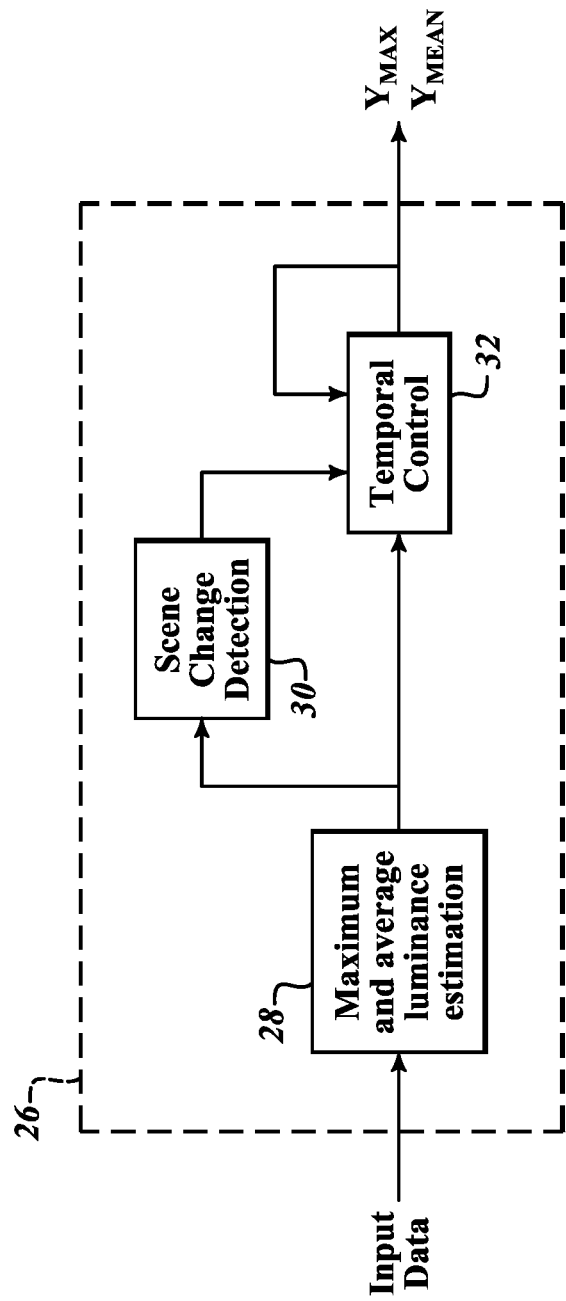
FIG. 3 is a block diagram illustrating an example of brightness analysis for the first embodiment of the tone mapping module according to one embodiment as disclosed herein.

FIG. 3 is a block diagram illustrating an example of the brightness analysis module 26 according to principles disclosed herein. The brightness analysis module 26 includes a maximum and average luminance estimation module 28, a scene change detection module 30, and a temporal control module 32.

The maximum and average luminance estimation module 28 estimates a maximum luminance value and an average luminance value. The maximum and average luminance estimation module 28 is not limited any particular method, and any suitable method of estimation may be used.

The scene detection module 30 detects transitions between scenes. That is, the scene detection module 30 determines when a scene of a video has changed to a subsequent frame. The scene detection module 30 is not limited any particular method, and any suitable scene detection may be used.

The temporal control module 32 temporally controls the maximum luminance value and the average luminance value to change gradually between subsequent frames, which are detected by the scene detection module 30. For instance, negative feedback with proportional control may be used to stabilize the estimated maximum luminance value and the average luminance value. For example, see U.S. Pat. No. 7,953,286, entitled "Automatic Contrast Enhancement," and U.S. Pat. No. 8,781,248, entitled "Image Details Preservation and Enhancement." The temporally controlled maximum luminance value and the average luminance value are then provided to the mapping curve generator module 20A and the adaptive boost control module 24A. In one embodiment, the mapping curve generator module 20A uses the temporally maximum luminance value to limit the range of values of the mapping curve $L_{display}$. In another embodiment, the adaptive boost control module 24A uses the temporally controlled average luminance value to calculate a mean-adaptive gain. For example, see U.S. Pat. No. 7,953,286, entitled "Automatic Contrast Enhancement," and U.S. Pat. No. 8,781,248, entitled "Image Details Preservation and Enhancement."

Figure 4:
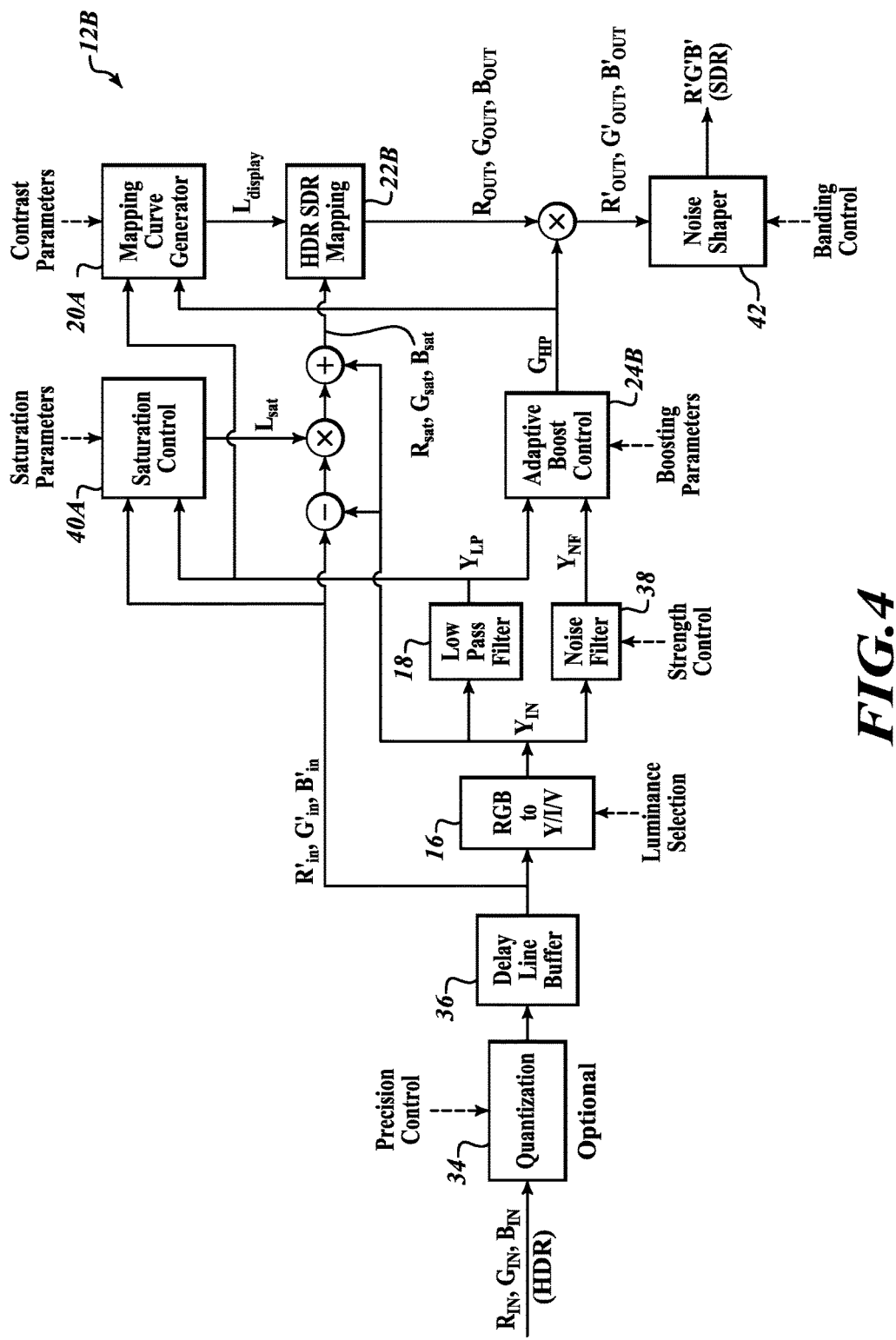
FIG. 4 is a block diagram illustrating an example of a tone mapping module according to a second embodiment as disclosed herein.

FIG. 4 is a block diagram illustrating an example of a second embodiment of a tone mapping module 12B according to principles disclosed herein. Similar to the tone mapping module 12A, the tone mapping module 12B includes the RGB to Y/I/V module 16, the low-pass filter module 18, and the mapping curve generator module 20A. In addition, the tone mapping module 12B includes a quantization module 34, a delay line buffer module 36, a noise filter module 38, a saturation control module 40A, a HDR-SDR mapping module 22B, an adaptive boost control module 24B, and a noise shaper module 42.

Similar to the tone mapping module 12A, the tone mapping module 12B receives high dynamic range red, green, blue values $R_{IN}$, $G_{IN}$, $B_{IN}$ of an image or video from the source.

The quantization module 34 quantizes the high dynamic range red, green, blue values $R_{IN}$, $G_{IN}$, $B_{IN}$ to compress the number of values and improve processing time. The quantization module 28 is not limited any particular method, and any suitable method of quantization may be used.

The delay line buffer module 36 passes the high dynamic range red, green, blue values from the quantization module 34 through buffers to create a delay line. The delay line buffer module 36 is not limited any particular method, and any suitable method of estimation may be used.

The RGB to Y/I/V module 16 processes the high dynamic range red, green, blue values $R'_{IN}$, $G'_{IN}$, $B'_{IN}$ from the delay line buffer module 36. The RGB to Y/I/V module 16, as discussed with respect to FIG. 2, processes the high dynamic range red, green, blue values $R_{IN}$, $G_{IN}$, $B_{IN}$ to obtain luminance values $Y_{IN}$.

The low-pass filter module 18, as discussed with respect to FIG. 2, processes the luminance values $Y_{IN}$ from the RGB to Y/I/V module 16 to obtain low spatial frequency components $Y_{LP}$ of the luminance values $Y_{IN}$.

The noise filter module 38 increases noise robustness of the tone mapping module 12B. If there is considerable noise in the luminance values $Y_{IN}$ prior to being used by the adaptive boost control module 24B, the adaptive boost control module 24B will preserve or enhance the noise. To prevent noise from being preserved or enhanced, the noise filter module 38 applies a noise filter to the luminance values $Y_{IN}$ prior to the adaptive boost control module 24B. In one embodiment, the noise filtered luminance values $Y_{NF}$ are calculated using the following equation.

$$Y_{NF}=NF(Y_{IN})$$

where NF( ) is derived from a 5-Tap H+3-Tap V adaptive filter. It should be noted that other conventional methods may be used for filtering noise. For example, see U.S. Pat. No. 7,145,607, entitled "Spatio-Temporal Video Noise Reduction System."

The saturation control module 40A controls saturation of red, green, blue values to prevent out of gamut values from being clipped and causing false colors in the image or video. In one embodiment, a maximum saturation value $L_{MaxSat}$ for the red, green, blue values $R'_{IN}$, $G'_{IN}$, $B'_{IN}$ from the delay line buffer is calculated using the following equations.

$$\text{If}(R'_{In}>Y_{In}), L_{MaxR}=(C_{max}-Y_{In})/(R'_{In}-Y_{In})$$

$$\text{else if}(R'_{In}<Y_{In}), L_{MaxR}=(Y_{In})/(Y_{In}-R'_{In})$$

$$\text{else}, L_{MaxR}=1000, \text{any large number, or no limit}$$

$$\text{If}(G'_{In}>Y_{In}), L_{MaxG}=(C_{max}-Y_{In})/(G'_{In}-Y_{In})$$

$$\text{else if}(G'_{In}>Y_{In}), L_{MaxG}=(Y_{In})/(Y_{In}-G'_{In})$$

$$\text{else}, L_{MaxG}=1000, \text{any large number, or no limit}$$

$$\text{If}(B'_{In}>Y_{In}), L_{MaxB}=(C_{max}-Y_{In})/(B'_{In}-Y_{In})$$

$$\text{else if}(B'_{In}<Y_{In}), L_{MaxB}=(Y_{In})/(Y_{In}-B'_{In})$$

$$\text{else}, L_{MaxB}=1000, \text{any large number, or no limit}$$

$$L_{MaxSat}=\min(L_{MaxR}, L_{MaxG}, L_{MaxB})$$

where $0 \leq R'_{In}, G'_{In}, B'_{In} \leq C_{max}$ and $0 \leq R_{Out}, G_{Out}, B_{Out} \leq C_{max}$. $C_{max}$ is a constant value based on the bit resolution of the red, green, blue values $R'_{IN}$, $G'_{IN}$, $B'_{IN}$. For example, $C_{max}$ is equal to 1023 when the red, green, blue values $R'_{IN}$, $G'_{IN}$, $B'_{IN}$ have a bit resolution of 10 bits. It should be noted that other conventional methods may be used to calculate a maximum saturation level. Saturated controlled red, green, blue values $R_{Sat}$, $G_{Sat}$, $B_{Sat}$ are then calculated using the following equations.

$$R_{Sat}=L_{Sat}(Y_{IN})\times(R'_{IN}-Y_{IN})+Y_{IN}$$

$$G_{Sat}=L_{Sat}(Y_{IN})\times(G'_{IN}-Y_{IN})+Y_{IN}$$

$$B_{Sat}=L_{Sat}(Y_{IN})\times(B'_{IN}-Y_{IN})+Y_{IN}$$

where $L_{Sat} \leq L_{MaxSat}$. In another embodiment, the saturated controlled red, green, blue values $R_{Sat}$, $G_{Sat}$, $B_{Sat}$ is calculated using the low spatial frequency components $Y_{LP}$. For example, the saturated controlled red, green, blue values $R_{Sat}$, $G_{Sat}$, $B_{Sat}$ may be calculated using the following equations.

$$R_{Sat}=L_{Sat}(Y_{LP})\times(R'_{IN}-Y_{LP})+Y_{LP}$$

$$G_{Sat}=L_{Sat}(Y_{LP})\times(G'_{IN}-Y_{LP})+Y_{LP}$$

$$B_{Sat}=L_{Sat}(Y_{LP})\times(B'_{IN}-Y_{LP})+Y_{LP}$$

where $L_{Sat}$ is limited to the maximum saturation level $L_{MaxSat}$. It should be noted that other conventional methods may be used to control saturation.

The mapping curve generator module 20A, as previously discussed with respect to FIG. 2, generates a mapping curve $L_{display}$ that is used to map luminance values from a high dynamic range to a standard dynamic range.

The HDR-SDR mapping module 22B maps the saturated controlled red, green, blue values $R_{Sat}$, $G_{Sat}$, $B_{Sat}$ to a standard dynamic range to obtain the standard dynamic range red, green, blue values $R_{OUT}$, $G_{OUT}$, $B_{OUT}$. In one embodiment, the HDR-SDR mapping module 22B uses the mapping curve $L_{display}$, the saturated controlled red, green, blue values $R_{Sat}$, $G_{Sat}$, $B_{Sat}$, and the $R'_{IN}$, $G'_{IN}$, $B'^{IN}$ from the delay line buffer as input. For example, the standard dynamic range red, green, blue values $R_{OUT}$, $G_{OUT}$, $B_{OUT}$ may be calculated using the following equations.

$$R_{OUT}=G_C(R'_{IN})\times R_{Sat}$$

$$G_{OUT}=G_C(G'_{IN})\times G_{Sat}$$

$$B_{OUT}=G_C(B'_{IN})\times B_{Sat}$$

where $G_C(Y_X)=L_{display}(Y_X)/Y_X$. In another embodiment, the HDR-SDR mapping module 22B uses the luminance values $Y_{IN}$, instead of the high dynamic range red, green, blue values $R'_{IN}$, $G'_{IN}$, $B'_{IN}$, as input. For example, the mapped the red, green, blue values $R_{OUT}$, $G_{OUT}$, $B_{OUT}$ may be calculated using the following equations.

$$R_{OUT}=G_C(Y_{IN})\times R_{Sat}$$

$$G_{OUT}=G_C(Y_{IN})\times G_{Sat}$$

$$B_{OUT}=G_C(Y_{IN})\times B_{Sat}$$

where $G_C(Y_X)=L_{display}(Y_X)/Y_X$. In a further embodiment, the HDR-SDR mapping module 22B uses the low spatial frequency components $Y_{LP}$, instead of the high dynamic range red, green, blue values $R'_{IN}$, $G'_{IN}$, $B'_{IN}$, as input. For example, the standard dynamic range red, green, blue values $R_{OUT}$, $G_{OUT}$, $B_{OUT}$ may be calculated using the following equations.

$$R_{OUT}=G_C(Y_{LP})\times R_{Sat}$$

$$G_{OUT}=G_C(Y_{LP})\times G_{Sat}$$

$$B_{OUT}=G_C(Y_{LP})\times B_{Sat}$$

where $G_C(Y_X)=L_{display}(Y_X)/Y_X$.

The adaptive boost control module 24B, similar to the adaptive boost control module 24A, calculates the amount of the gain $G_{HP}$ to be applied to the standard dynamic range red, green, blue values $R_{OUT}$, $G_{OUT}$, $B_{OUT}$ to preserve or enhance image details. In one embodiment, the adaptive boost control module 24B calculates the gain $G_{HP}$ using the following equation.

If $Y_{In} \neq 0$, $G_{HP}=(k_{In}\times Y_{In}+k_{NF}\times Y_{NF}+k_{LP}\times Y_{LP})/(Y_{In})$ else, $G_{HP}=1$ where $k_{In}$, $k_{NF}$, and $k_{LP}$ are control parameters adaptive to a current luminance value, a mean luminance value, and/or contrast. For example, see U.S. Pat. No. 8,781,248, entitled "Image Details Preservation and Enhancement."

The gain $G_{HP}$ is then applied to the standard dynamic range red, green, blue values $R_{OUT}$, $G_{OUT}$, $B_{OUT}$ to obtain enhanced red, green, blue values $R'_{OUT}$, $G'_{OUT}$, $B'_{OUT}$ that are within the standard dynamic range. For example, the enhanced red, green, blue values $R'_{OUT}$, $G'_{OUT}$, $B'_{OUT}$ may be calculated using the following equations.

$$R'_{OUT}=R_{OUT}\times G_{HP}$$

$$G'_{OUT}=G_{OUT}\times G_{HP}$$

$$B'_{OUT}=B_{OUT}\times G_{HP}$$

It should be noted that any other known method may be used to apply the gain $G_{HP}$ to the standard dynamic range red, green, blue values $R'_{OUT}$, $G'_{OUT}$, $B'_{OUT}$.

In another embodiment, as previously discussed with respect to the adaptive boost control module 24A, a minimum and maximum control is used to calculate the controlled gain $G'_{HP}$. The controlled gain $G'_{HP}$ is then applied to the standard dynamic range red, green, blue values $R_{OUT}$, $G_{OUT}$, $B_{OUT}$ to obtain the enhanced red, green, blue values $R'_{OUT}$, $G'_{OUT}$, $B'_{OUT}$.

In a further embodiment, the gain $G_{HP}$ or the controlled gain $G'_{HP}$ is used to adaptively adjust the mapping curves $LUT_{Gamma}$, $LUT_{SCurve}$, and $LUT_{ToneMap}$.

The noise shaper module 42 reduces banding artifacts of the enhanced red, green, blue values $R'_{OUT}$, $G'_{OUT}$, $B'_{OUT}$. The noise shaper module 42 is not limited any particular method, and any suitable method of noise shaping may be used.

The tone mapping module 12B then outputs the enhanced red, green, blue values $R'_{OUT}$, $G'_{OUT}$, $B'_{OUT}$ that are within the standard dynamic range from the noise shaper 42.

Figure 5:
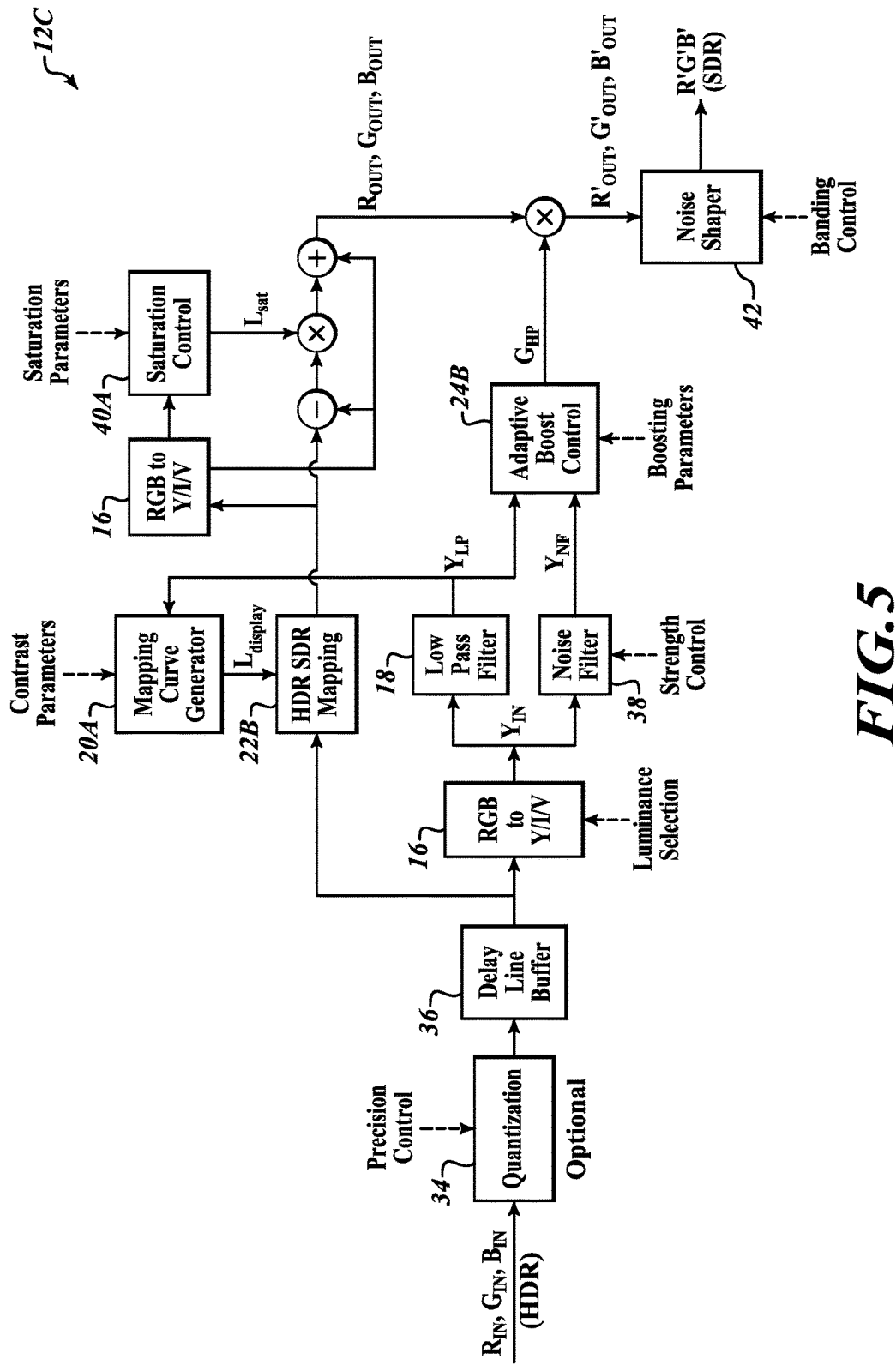
FIG. 5 is a block diagram illustrating an example of a tone mapping module according to a third embodiment as disclosed herein.

FIG. 5 is a block diagram illustrating an example of a third embodiment of a tone mapping module 12C according to principles disclosed herein. Similar to the tone mapping module 12B, the tone mapping module 12C includes the quantization module 34, the delay line buffer module 36, the RGB to Y/I/V module 16, the low-pass filter module 18, noise filter module 38, the adaptive boost control module 24B, the mapping curve generator module 20A, the HDR-SDR mapping module 22B, the saturation control module 40A, and the noise shaper module 42. However, in contrast to the tone mapping module 12B, the saturation control module 40A is positioned subsequent to the mapping by the HDR-SDR mapping module 22B. That is, the saturation control module 40A limits the saturation gain of the standard dynamic range red, green, blue values $R_{OUT}$, $G_{OUT}$, $B_{OUT}$ from the HDR-SDR mapping module 22B.

Figure 6:
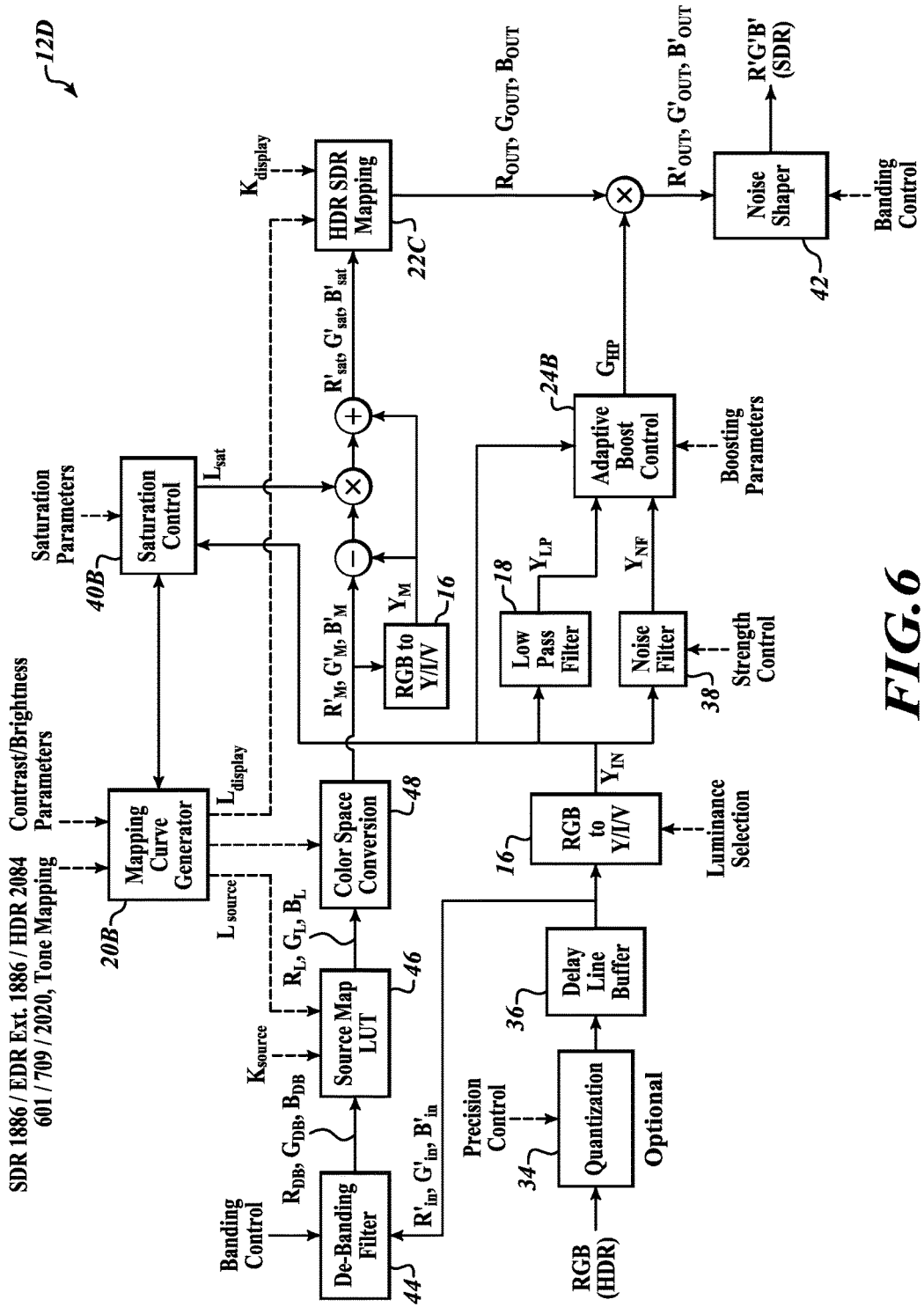
FIG. 6 is a block diagram illustrating an example of a tone mapping module according to a fourth embodiment as disclosed herein.

FIG. 6 is a block diagram illustrating an example of a third embodiment of a tone mapping module 12D according to principles disclosed herein. Similar to the tone mapping modules 12B, the tone mapping module 12D includes the quantization module 34, delay line buffer module 36, the RGB to Y/I/V module 16, the low-pass filter module 18, the noise filter module 38, the adaptive boost control module 24B, and the noise shaper module 42. In addition, the tone mapping module 12D includes a de-banding filter module 44, a mapping curve generator module 20B, a source map lookup table module 46, a color space conversion module 48, a saturation control module 40B, and a HRD-SDR mapping module 22C.

Similar to the tone mapping module 12B, the tone mapping module 12D receives high dynamic range red, green, blue values $R_{IN}$, $G_{IN}$, $B_{IN}$ of an image or video from the source.

As previously discussed with respect to FIG. 4, the quantization module 28 quantizes the high dynamic range red, green, blue values $R_{IN}$, $G_{IN}$, $B_{IN}$ to compress the number of values and improve processing time. The delay line buffer module 36 passes the high dynamic range red, green, blue values from the quantization module 28 through buffers to create a delay line. The RGB to Y/I/V module 16 processes the high dynamic range red, green, blue values $R'_N$, $G'_{IN}$, $B'_{IN}$ from the delay line buffer module 36 to obtain luminance values $Y_{IN}$. The low-pass filter module 18 processes the luminance values $Y_{IN}$ from the RGB to Y/I/V module 16 to obtain low spatial frequency components $Y_{LP}$ of the luminance values $Y_{IN}$. The noise filter module 38 applies a noise filter to the luminance values $Y_{IN}$ to filter out noise. The adaptive boost control module 24B calculates the gain $G_{HP}$ or the controlled gain $G'_{HP}$ to be applied to the standard dynamic range red, green, blue values $R_{OUT}$, $G_{OUT}$, $B_{OUT}$ to preserve or enhance image details.

The de-banding filter module 44 filters banding noise in the image or video. Particularly, the de-banding filter module 44 applies a de-banding filter to red, green, blue values $R'_N$, $G'_{IN}$, $B'_{IN}$ from the delay line buffer module 36 to obtain de-band filtered red, green, blue values $R_{DB}$, $G_{DB}$, $B_{DB}$. The de-banding filter module 44 is not limited any particular method, and any suitable de-banding filter may be used. For example, see U.S. Pat. No. 9,092,856, entitled "Recursive de-banding filter for digital images."

The mapping curve generator module 20B generates three separate maps. Namely, the mapping curve generator module 20B creates a linear space red, green, blue map $L_{source}$ for the source map lookup table module 46; a color space conversion map for the color space conversion module 48; and, as previously discussed with respect to the mapping curve generator module 20A, the mapping curve $L_{display}$ for the HRD-SDR mapping module 22C. The linear space red, green, blue map $L_{source}$; the color space conversion map; and the mapping curve $L_{display}$ will be discussed in further detail with respect to the source map lookup table module 46, the color space conversion module 48, and the HRD-SDR mapping module 22C, respectively. It should be noted that the linear space red, green, blue map $L_{source}$, the color space conversion map, and the mapping curve $L_{display}$ are not limited to any particular set of curves, and conventional curves for such mappings may be used.

The source map lookup table module 46 uses the linear space red, green, blue map $L_{source}$ to convert the de-band filtered red, green, blue values $R_{DB}$, $G_{DB}$, $B_{DB}$ to linear space red, green, blue values $R_L$, $G_L$, $B_L$. For instance, the linear space red, green, blue values $R_L$, $G_L$, $B_L$ may be calculated using the following equations.

$R_L = K_{Source} \times L_{Source}(R_{DB}) \times R_{DB}$ $G_L = K_{Source} \times L_{Source}(G_{DB}) \times G_{DB}$ $B_L = K_{Source} \times L_{Source}(B_{DB}) \times B_{DB}$ where $K_{source}$ is a control parameter for converting red, green, blue values to a liner space. It should be noted that other conventional methods may be used to convert red, green, blue values to a linear space.

The color space conversion module 48 uses the color space conversion map to convert the linear space red, green, blue values $R_L$, $G_L$, $B_L$ to the proper color space of the display device. In one embodiment, the color space conversion module 48 converts the linear space red, green, blue values $R_L$, $G_L$, $B_L$ to the converted color space red, green, blue values $R_M$, $G_M$, $B_M$ using the following equations.

$$\begin{bmatrix} R_M \\ G_M \\ B_M \end{bmatrix} = \begin{bmatrix} k_{RR} & k_{RG} & k_{RB} \\ k_{GR} & k_{GG} & k_{GB} \\ k_{BR} & k_{BG} & k_{BB} \end{bmatrix} \begin{bmatrix} R_L \\ G_L \\ B_L \end{bmatrix}$$

where $k_{RR}$, $k_{RG}$, $k_{RB}$, $k_{GR}$, $k_{GG}$, $k_{GB}$, $k_{BR}$, $k_{BG}$, $k_{BB}$ are control parameters for the color space conversion map. It should be noted that any other known method may be used to convert red, green, blue values to a proper color space.

In one embodiment, the color space conversion module 48 clips any out of gamut values of the converted color space red, green, blue values $R_M$, $G_M$, $B_M$. For example, clipped red, green, blue values $R'_M$, $G'_M$, $B'_M$ may be calculated using the following equation.

$$\begin{bmatrix} R'_M \\ G'_M \\ B'_M \end{bmatrix} = K_{Clip} \times \begin{bmatrix} R_M \\ G_M \\ B_M \end{bmatrix}$$

where $K_{Clip}$ is a control parameter for clipping. It should be noted that any other conventional methods may be used to clip converted color space red, green, blue values.

The saturation control module 40B controls the saturation of the clipped red, green, blue values $R'_M$, $G'_M$, $B'_M$ to prevent colors from being clipped at higher values and causing false colors in the image or video. In one embodiment, the saturation control module 40B calculates saturated controlled red, green, blue values $R'_{Sat}$, $G'_{Sat}$, $B'_{Sat}$ using the following equations.

$Y_M = \max(R'_M, G'_M, B'_M)$ or $(a \times R'_M + b \times G'_M + c \times B'_M)$ $R'_{Sat} = L_{Sat}(Y_{IN}) \times (R'_M - Y_M) + Y_M$ $G'_{Sat} = L_{Sat}(Y_{IN}) \times (G'_M - Y_M) + Y_M$ $B'_{Sat} = L_{Sat}(Y_{IN}) \times (B'_M - Y_M) + Y_M$ where a, b, and c, are constants for red, green, blue to luminance conversion, and $L_{sat} \leq L_{MaxSat}$. It should be noted that other conventional methods may be used to control saturation.

The HDR-SDR mapping module 22C maps the saturated controlled red, green, blue values $R'_{Sat}$, $G'_{Sat}$, $B'_{Sat}$ to a standard dynamic range to obtain the standard dynamic range red, green, blue values $R_{OUT}$, $G_{OUT}$, $B_{OUT}$. In one embodiment, the HDR-SDR mapping module 22C uses the mapping curve $L_{display}$. Namely, the standard dynamic range red, green, blue values $R_{OUT}$, $G_{OUT}$, $B_{OUT}$ are calculated using the following equations.

$R_{Out} = K_{Display} \times L_{display}(R'_{Sat}) \times R'_{Sat}$ $G_{Out} = K_{Display} \times L_{display}(G'_{Sat}) \times G'_{Sat}$ $B_{Out} = K_{Display} \times L_{display}(B'_{Sat}) \times B'_{Sat}$ where $K_{Display}$ is a control parameter for high dynamic range to standard dynamic range mapping.

As previously discussed with respect to FIG. 4, the gain $G_{HP}$ or the controlled gain $G'_{HP}$ is calculated and then applied to the standard dynamic range red, green, blue values $R_{OUT}$, $G_{OUT}$, $B_{OUT}$ to obtain the enhanced red, green, blue values $R'_{OUT}$, $G'_{OUT}$, $B'_{OUT}$ that are within the standard dynamic range. The enhanced red, green, blue values $R'_{OUT}$, $G'_{OUT}$, $B'_{OUT}$ are then provided to the noise shaper module 42 to reduce banding artifacts of the enhanced red, green, blue values $R'_{OUT}$, $G'_{OUT}$, $B'_{OUT}$. The tone mapping module 12A then outputs the enhanced red, green, blue values $R'_{OUT}$, $G'_{OUT}$, $B'_{OUT}$ that are within the standard dynamic range from the noise shaper module 42.

Figure 7:
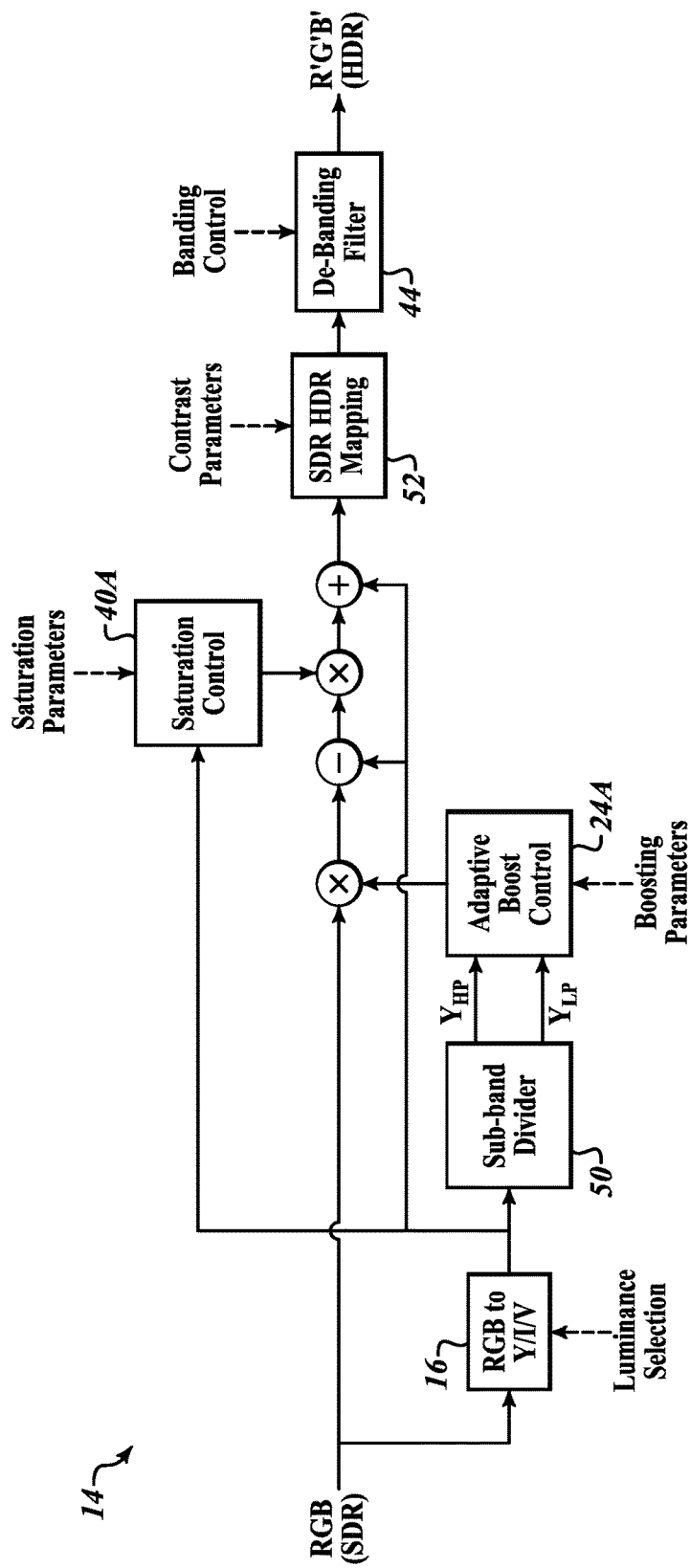
FIG. 7 is a block diagram illustrating an example of an inverse tone mapping module according to one embodiment as disclosed herein.

FIG. 7 is a block diagram illustrating an example of the inverse tone mapping module 14 according to principles disclosed herein. The inverse tone mapping module 14 increases the luminance of an image or video from the standard dynamic range to the high dynamic range, while preserving or enhancing image details. The inverse tone mapping module includes the RGB to Y/I/V module 16, the adaptive boost control module 24A, the saturation control module 40A, and the de-banding filter 44. In addition, the inverse tone mapping module 14 includes a sub-band divider 50 and a SDR-HDR mapping module 52.

The inverse tone mapping module 14 receives red, green, blue values of an image or video from the source that are within the standard dynamic range.

The RGB to Y/I/V module 16, as previously discussed with respect to FIG. 2, processes the standard dynamic range red, green, blue values to obtain luminance values.

The sub-band divider 50 processes the luminance values from the RGB to Y/I/V module 16 to obtain low spatial frequency components $Y_{LP}$ and high spatial frequency components $Y_{HP}$. For example, as described in detail with respect to the low-pass filter module 18 and the adaptive boost control module 24A, the low spatial frequency components $Y_{LP}$ may be obtained by using a low-pass filter, and the high spatial frequency components $Y_{HP}$ by subtracting the low spatial frequency components $Y_{LP}$ from the luminance values $Y_{IN}$. It should be noted that other conventional methods may be used.

The adaptive boost control module 24A, as previously discussed with respect to FIG. 2, determines a gain or a controlled gain to preserve or enhance image details. However, in contrast to the tone mapping modules 12A, 12B, 12C, and 12D, the inverse tone mapping module 14 applies the gain or the controlled gain to the standard dynamic range red, green, blue values, instead of the standard dynamic range red, green, blue values $R_{OUT}$, $G_{OUT}$, $B_{OUT}$, to obtain enhanced standard dynamic range red, green, blue values.

The saturation control module 40A, as previously discussed with respect to FIG. 4, prevents out of gamut values from being clipped and causing false colors in the image or video. The saturation control module 40A controls the saturation of the enhanced standard dynamic range red, green, blue values to obtain saturated controlled red, green, blue values. It should be noted that other conventional methods may be used to control saturation.

The SDR-HDR mapping module 52 maps the saturated controlled red, green, blue values using a standard dynamic range to high dynamic range map to obtain high dynamic range red, green, blue values. The standard dynamic range to high dynamic range map is not limited to any particular curve, and any conventional curve for standard dynamic range to high dynamic range mapping may be used.

The de-banding filter module 44, as previously discussed with respect to FIG. 6, filters banding noise. The de-banding filter module 44 applies a de-banding filter to the high dynamic range red, green, blue values from the SDR-HDR mapping module 52. The de-banding filter module 44 is not limited any particular method, and any suitable de-banding filter may be used. For example, see U.S. Pat. No. 9,092,856, entitled "Recursive de-banding filter for digital images."

The inverse tone mapping module 14 then outputs the high dynamic range red, green, blue values from the de-banding filter module 44.

The various embodiments of the tone mapping module 12 and the inverse tone mapping module 14 results in tone mapping of images and video from one dynamic range to another while preserving or enhancing image details.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving red, green, blue data of an image from a content provider, the received red, green, blue data having a high dynamic range;
   calculating luminance data from the red, green, blue data;
   inputting the luminance data to a low pass filter and generating low frequency luminance data as an output;
   inputting both the luminance data and the low frequency luminance data to a gain calculating circuit;
   calculating a gain based on the luminance data and the low frequency luminance data;
   mapping, using a mapping curve that maps luminance values from the high dynamic range to a standard dynamic range, the received red, green, blue data from the high dynamic range to the standard dynamic range to generate mapped red, green, blue data having the standard dynamic range;
   applying the gain to the mapped red, green, blue data to generate enhanced red, green, blue data; and
   outputting the enhanced red, green, blue data to a display device.

2. The method of claim 1, further comprising:
   filtering noise from the luminance data prior to the calculating of the gain.

3. The method of claim 1, further comprising:
   limiting saturation values of the received red, green, blue data prior to the mapping.

4. The method of claim 1, further comprising:
   inputting the low frequency luminance data to a brightness analysis circuit;
   performing a brightness analysis on the low frequency luminance data to obtain a brightness factor; and outputting the brightness factor to the gain calculating circuit.

5. The method of claim 1, further comprising:
applying a de-banding filter to the received red, green, blue data.

6. The method of claim 1, further comprising:
converting the received red, green, blue data to a linear space prior to the mapping.

7. The method of claim 1, further comprising:
converting the received red, green, blue data to a color space of the display device prior to the mapping.

8. A method, comprising:
receiving red, green, blue values of an image from a content provider, the received red, green, blue values having a high dynamic range;
converting the received red, green blue values to luminance values;
filtering the luminance values with a low pass filter to generate filtered luminance values;
inputting both the luminance values and the filtered luminance values to a gain calculating circuit;
calculating a gain value using the luminance values and the filtered luminance values;
generating a mapping curve that maps luminance values from the high dynamic range to a lower dynamic range;
generating mapped red, green, blue values by mapping the received red, green, blue values to values within the lower dynamic range using the mapping curve;
enhancing the mapped red, green, blue values by applying the gain value to the mapped red, green, blue values; and
providing the enhanced red, green, blue data to a display device.

9. The method of claim 8, further comprising:
filtering noise from the luminance values prior to the determining of the gain.

10. The method of claim 8, further comprising:
limiting saturation values of the received red, green, blue values prior to the generating of the mapped red, green, blue values.

11. The method of claim 8, further comprising:
limiting saturation values of the mapped red, green, blue values.

12. The method of claim 8, further comprising:
applying a de-banding filter to the received red, green, blue values.

13. The method of claim 8, further comprising:
converting the received red, green, blue data to a linear space prior to the generating of the mapped red, green, blue values.

14. The method of claim 8, further comprising:
converting the received red, green, blue data to a color space of the display device prior to the generating of the mapped red, green, blue values.

* * * * *